United States Patent Office 2,921,062
Patented Jan. 12, 1960

2,921,062

STREPTOMYCIN PURIFICATION

Leon J. Heuser, Princeton, N.J., assignor to Olin Mathieson Chemical Corporation, New York, N.Y., a corporation of Virginia No Drawing. Application September 26, 1957
Serial No. 686,290

8 Claims. (Cl. 260—210)

This invention relates to, and has for its object the provision of, an improved process for the purification of antibiotics of the stretptomycin type (i.e. members of the genus composed of streptomycin and antibiotically-active compounds which, like streptomycin, possess a functional carbonyl group).

The presently employed processes of recovering streptomycin type antibiotics from aqueous culture media in which the antibiotic is produced, or from aqueous solutions in which the antibiotic or its salts are otherwise present in impure state, require numerous steps to obtain the antibiotic in sufficient purity to be safe for administration to humans. The commonly employed purification and recovery processes require the adsorption of the antibiotic on an ion-exchange resin and a plurality of extractive or precipitative steps for removing the antibiotic from the adsorbent and for purifying it.

Because of the ready solubility of streptomycin type antibiotics and their common salts in water, and their very slight solubility in most organic solvents, it has been difficult, if not impossible, to purify streptomycin type antibiotics by solvent extraction processes, and to free them from the chemically-related impurities which inevitably are produced by the fermentation simultaneously with the desired antibiotic (so-called "genetic contaminants"), and the water-soluble inorganic salt impurities which are present as constituents of the culture medium or are introduced by preliminary processing steps.

It has been found that selective purification of streptomycin type antibiotics can be accomplished by a method which essentially comprises reacting the antibiotic (or salts thereof), in solution, with certain non-acidic primary amines so as to form crystalline imine (Schiff base) type derivatives which can be easily separated from the impure solution and from which the antibiotic (or salt thereof), of increased purity, can be regenerated.

It therefore is an object of the present invention to provide a simple, efficient process of obtaining streptomycin type antibiotics or their salts in a purified state.

A further object of this invention is the provision of novel derivatives of streptomycin useful in these purification methods and for other purposes, and methods of preparing them.

These objectives have been achieved by a method essentially comprising starting with (or preparing) a solution of the impure antibiotic (or salt thereof), interacting therewith a non-acidic primary amine, preferably of 7–18 carbon atoms, recovering the resulting crystalline Schiff base derivative, and reconverting said derivative to a substantially purer antibiotic.

More particularly, the process—as applied to streptomycin—comprises introducing into an impure solution of streptomycin (or salt thereof) a non-acidic primary amine of the general formula R—NH$_2$, wherein R is an organic radical of 7–18 carbon atoms selected from the group consisting of alkyl, substituted alkyl, aralkyl and substituted aralkyl, recovering the resulting crystalline streptomycin Schiff base derivative, hydrolyzing said derivative in the presence of water with acid, removing the amine from the aqueous solution by solvent extraction or other means and, recovering streptomycin (or salt thereof) of increased purity.

Amines utilizable for the purpose include, inter alia, the lauryl, cetyl, stearyl, nonyl, 1,3-diphenylisopropyl, benzyl, benzhydryl, p-chlorobenzylhydryl, β-phenethyl, p-nitrophenethyl, α-phenylpropyl, p-methylbenzyl, p-methoxybenzyl, p-methoxybenzhydryl, 3-nitro-4-methylbenzyl, β-(naphythyl-1)ethyl, and cinnamyl amines. Other amines utilizable include, inter alia, 2-amino-1,2-diphenylethanol, N-(2-aminoethyl)-N-ethyl-m-toluidine, and N-1-naphthylethylene diamine. The use of the free base is preferred, although the salt (e.g. hydrochloride or sulfate) may be used, in which case alkali or an amine such as methylamine must be added to obtain the proper pH.

Where necessary, an organic solvent may be used to decrease the solubility of the Schiff base derivative or increase the solubility of the amine to prevent the amine from precipitating from solution. Solvents thus utilizable include, inter alia, methanol, ethanol, isopropyl alcohol, propanol and dioxane.

The pH of the reaction should be alkaline, say about 8.0–10.5, and room temperature may be employed although a more rapid rate is obtained at higher temperature.

The Schiff base derivative is readily hydrolyzed in the presence of water with acid. The higher molecular weight aralkylamines (i.e. benzhydrylamine, dibenzylmethylamine) may be removed from the aqueous solution by solvent extraction. The lower aralkylamines may be separated by the various methods, as shown in the examples; and, the fatty amines may be removed for example, by precipitation or extraction of their sulfates.

The following examples are illustrative, but by no means limitative of the invention.

Example I (a) To 10 g. of relatively-pure streptomycin sulfate (740 u./mg.) dissolved in 25 ml. water is added 4 ml. β-phenethylamine (pH 8.8). The solution is agitated at room temperature for two hours, during which time a crystalline product forms. After allowing the mixture to stand overnight, the streptomycin-β-phenethylamine derivative crystals are filtered and washed with 8 ml. water. About 8.2 g. of dried crystals are obtained with a streptomycin activity of about 730 u./mg.

(b) 7 g. of the streptomycin β-phenethylamine derivative obtained in (a) is slurried in 21 ml. water and agitated with 25 ml. benzaldehyde, the pH being adjusted to pH 8.1 with 40% H$_2$SO$_4$. After agitation for a half hour, the aqueous layer is separated and extracted twice with 25 ml. ethylene dichloride. The pH is then adjusted to 6.3 with H$_2$SO$_4$, the residual solvent evaporated, and the solution treated with 1 g. of activated charcoal. On freeze drying, about 5 g. streptomycin sulfate is obtained with an activity of about 765 u./mg.

Example II (a) To 66 ml. streptomycin eluate (260,000 u./ml.) obtained from a cation-exchange column (a conventional step in the recovery of streptomycin from the culture in which it has been produced) is added slowly, with agitation, a solution of 12 dibenzylmethylamine in 80 ml. methanol. The mixture is heated to 40–45° C. at the start to initiate crystallization. After the addition is completed, the pH is adjusted from 7.3 to 9.0 with triethylamine. The agitation is continued for one half hour and the mixture stored at 5–10° C. overnight. The crystals are filtered and washed with 50 ml. 60% aqueous methanol and 100 ml. 100% methanol. On drying, about 25.5 g. streptomycindibenzylamine is obtained with an activity of about 605 u./mg.

(b) 5 g. of the derivative obtained in (a) is slurried in a mixture of 50 ml. chloroform and 50 ml. water and the pH then adjusted to 7.0–7.5 with 40% sulfuric acid. The aqueous layer is separated and reextracted with 25 ml. chloroform. After treatment with 0.6 g. activated charcoal, the aqueous solution is freeze-dried to yield about 3.5 g. streptomycin sulfate with an activity of about 785 u./mg.

*Example III*

(a) To 100 g. relatively pure streptomycin sulfate (740 u./mg.) dissolved in sufficient water so that the total volume of solution is 310 ml., there is added, with agitation, 80 ml. isopropyl alcohol followed by 34 g. β-phenethylamine. The solution is allowed to stand at 5–10° C. overnight. The crystals formed are filtered and washed first with aqueous isopropyl alcohol and then with 100% isopropyl alcohol. Drying yields about 97.7 g. streptomycin-β-phenethylamine derivative with an activity of about 708 u./mg.

(b) 10 g. of the derivative obtained in (a) is slurried in 100 ml. 85% aqueous methanol and the pH adjusted to 3.0–3.5 with 40% $H_2SO_4$. After 2 hours agitation, the slurry is filtered and the cake washed first with 90% aqueous methanol and then with 100% methanol. The solids are dissolved in water, the residual amine removed with carbon, and the resulting solution neutralized and freeze-dried to yield streptomycin sulfate of substantially increased purity.

*Example IV*

(a) To a warm solution of 10 g. relatively pure streptomycin sulfate (740 u./mg.) in 100 ml. water is added a solution of 7 g. cetylamine in 80 ml. methanol. An oily semicrystalline material is obtained which solidifies on cooling to room temperature. The mixture is agitated for 3 hours and then filtered. After filtration and washing with 40% aqueous methanol and 100% methanol, the solids are dried to yield about 13 g. streptomycin-cetyl amine derivative with an activity of about 350 u/mg.

(b) 10 g. of the cetyalmine derivative obtained in (a) is slurried in 90 ml. water; 90 ml. pentasol is added and the mixture acidified to about pH 2.0 with $H_2SO_4$. After 3 hours agitation the solids are filtered off and the two layers separated. The aqueous phase is neutralized with an anion exchange resin of the amine type (e.g. IR–45), filtered and freeze-dried to yield about 3.0 g. streptomycin sulfate with an activity of about 750 u./mg.

*Example V*

(a) A solution of 30 g. relatively pure streptomycin sulfate (740 u./mg.) in 150 ml. water is mixed with a solution of 9 ml. benzhydrylamine in 150 ml. butanol and the mixture adjusted to pH 9.0 with triethylamine. After ¾ hour agitation, the derivative starts to crystallize. Agitation is continued for 2 hours and the crystals filtered and washed with methanol to yield, on drying, about 10.5 g. of streptomycinbenzhydrylamine with an activity of about 640 u./mg.

(b) 7.5 g. of the streptomycin-benzhydrylamine derivative obtained in (a) is slurried in a mixture of 90 ml. ethylene dichloride and the pH adjusted with 40% $H_2SO_4$ to 7.2. After one hour agitation, the small amount of insoluble material is filtered off and the solutions separated. After reextraction of the aqueous layer with a fresh ethylene dichloride (90 ml.), the aqueous solution is treated with 0.8 g. activated charcoal for 30 minutes and filtered. Freeze-drying yields about 5 g. streptomycin sulfate with an activity of about 780 u./mg.

*Example VI*

(a) 74 ml. streptomycin solution (200,000 u./ml.) is diluted with 20 ml. dioxane and 6 g. benzylamine is added. The solution (pH 8.7) is agitated one hour to initiate crystallization and is allowed to stand at 5–10° C. overnight. After filtration and washing the crystals with aqueous dioxane, about 18.2 g. of streptomycin-benzylamine is obtained on drying (about 728 u./mg.).

(b) 10 g. streptomycin-benzylamine derivative is slurried in 100 ml. 90% methanol and 40% $H_2SO_4$ is added to pH 2.5–3.0. After 2 hours agitation, the solids are filtered and washed with 40 ml. 90% methanol followed by 40 ml. 100% methanol. The partially converted material, containing about 12% of the original benzyl amine present, is dissolved in 60 ml. water and passed through a mono-bed column containing 4 ml. of a cation exchange resin of the sulfonic type (e.g. XE–144–H cycle) and 2 ml. of an anion exchange resin of the amine type (e.g. IR–45–OH cycle). The effluent is neutralized with additional IR–45 and freeze dried. Yield 7.5 g. streptomycin sulfate with an activity of 761 u./mg.

The invention may be variously otherwise embodied within the scope of the appended claims.

What is claimed is:

1. The method of purifying a member selected from the group consisting of streptomycin and an acid salt thereof which essentially comprises reacting the antibiotic, in solution, with a non-acidic primary amine of the general formula R—$NH_2$, wherein R is an organic radical of 7–18 carbon atoms selected from the group consisting of alkyl, substituted alkyl, aralkyl and substituted aralkyl, recovering the crystalline streptomycin Schiff base derivative, and reconverting said derivative to a substantially purer antibiotic.

2. The method of claim 1 wherein the antibiotic is streptomycin.

3. The method of claim 1 wherein the antibiotic is streptomycin sulfate.

4. The method of claim 3 wherein the primary amine is cetylamine.

5. The method of claim 3 wherein the primary amine is benzylamine.

6. The method of claim 3 wherein the primary amine is benzhydrylamine.

7. The method of claim 3 wherein the primary amine is β-phenethylamine.

8. The method of claim 3 wherein the primary amine is dibenzylmethylamine.

References Cited in the file of this patent

UNITED STATES PATENTS

| | | |
|---|---|---|
| 2,644,417 | Winsten | Dec. 29, 1953 |
| 2,767,168 | Cheney | Oct. 16, 1956 |